(12) United States Patent
De Jong

(10) Patent No.: US 11,293,340 B2
(45) Date of Patent: Apr. 5, 2022

(54) ENGINE CONFIGURATION

(71) Applicant: DAF Trucks N.V., Eindhoven (NL)

(72) Inventor: Dirk-Jan De Jong, Mierlo (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 16/978,314

(22) PCT Filed: Mar. 6, 2019

(86) PCT No.: PCT/NL2019/050136
§ 371 (c)(1),
(2) Date: Sep. 4, 2020

(87) PCT Pub. No.: WO2019/172751
PCT Pub. Date: Sep. 12, 2019

(65) Prior Publication Data
US 2021/0003069 A1   Jan. 7, 2021

(30) Foreign Application Priority Data
Mar. 7, 2018   (NL) ..................................... 2020546

(51) Int. Cl.
*F02B 37/02* (2006.01)
*F02B 37/00* (2006.01)
(Continued)

(52) U.S. Cl.
CPC .......... *F02B 37/025* (2013.01); *F02B 37/001* (2013.01); *F02B 75/20* (2013.01); *F02B 2075/1824* (2013.01)

(58) Field of Classification Search
CPC ...... F02B 37/025; F02B 37/001; F02B 75/20; F02B 2075/1824; F02B 37/18; F01L 1/34; F01L 1/08
(Continued)

(56) References Cited

U.S. PATENT DOCUMENTS 1,911,874 A * 5/1933 Barkeij .................... F16F 15/24
    123/54.7
2,730,861 A * 1/1956 Buchi .................... F02B 37/025
    60/605.1
(Continued)

FOREIGN PATENT DOCUMENTS

EP   2626531 A1   8/2013
GB   193266 A *   2/1923 ................ F01L 1/42
(Continued)

OTHER PUBLICATIONS

Jun. 21, 2019, International Search Report and Written Opinion, PCT/NL2019/050136.
(Continued)

*Primary Examiner* — Thai Ba Trieu
(74) *Attorney, Agent, or Firm* — Banner & Witcoff, Ltd.

(57) ABSTRACT

According to the invention, a method is provided of operating a combustion engine comprising more than three cylinders with cylinder valves that are operated in a cycle of fuel intake, pressurizing, firing and exhaust strokes. The method comprises carrying out the cycle for at least two cylinders in a simultaneous operation; and having the simultaneously operated cylinders to exhaust in a manifold that couples to a single turbine.

4 Claims, 5 Drawing Sheets

(51) Int. Cl.
*F02B 75/20* (2006.01)
*F02B 75/18* (2006.01)

(58) Field of Classification Search
USPC .......................................................... 60/602
See application file for complete search history.

(56) References Cited

U.S. PATENT DOCUMENTS

| | | | | | |
|---|---|---|---|---|---|
| 2,740,389 | A * | 4/1956 | Reyl | ...................... | F02M 1/00 |
| | | | | | 123/184.34 |
| 4,565,167 | A * | 1/1986 | Bryant | .................... | F02B 33/22 |
| | | | | | 123/560 |
| 4,783,966 | A * | 11/1988 | Aldrich | .............. | F01L 13/0015 |
| | | | | | 60/622 |
| 4,940,026 | A * | 7/1990 | Fisher | .................. | F02B 75/243 |
| | | | | | 123/55.4 |
| 7,063,059 | B2 * | 6/2006 | Calderwood | ....... | F02D 13/0215 |
| | | | | | 123/146.5 A |
| 7,134,407 | B1 * | 11/2006 | Nelson | ................... | F02B 75/22 |
| | | | | | 123/54.4 |
| 7,533,640 | B2 * | 5/2009 | Hahn | ....................... | F01L 1/08 |
| | | | | | 123/90.16 |
| 8,899,193 | B2 * | 12/2014 | Lippitt | ..................... | F01B 1/10 |
| | | | | | 123/52.3 |
| 9,441,551 | B2 * | 9/2016 | Boyer | .................... | F02B 75/20 |
| 9,657,637 | B2 * | 5/2017 | McConville | ........ | F02D 41/0087 |
| 9,874,166 | B2 * | 1/2018 | Ervin | .................. | F02D 41/0087 |
| 10,267,222 | B2 * | 4/2019 | McConville | ........... | F02B 75/02 |
| 10,947,948 | B1 * | 3/2021 | Glugla | ................... | F02P 15/02 |
| 10,975,697 | B2 * | 4/2021 | Mulligan | ................. | F01B 9/02 |
| 2010/0037601 | A1 | 2/2010 | Pierpont | | |
| 2012/0042649 | A1 * | 2/2012 | Kaneko | .............. | F02D 13/0246 |
| | | | | | 60/614 |
| 2017/0114749 | A1 * | 4/2017 | Takayama | ............... | F02B 75/20 |
| 2017/0198613 | A1 * | 7/2017 | Raimondi | ................ | F01L 1/34 |

FOREIGN PATENT DOCUMENTS

| | | |
|---|---|---|
| GB | 2535537 A | 8/2016 |
| JP | S639627 A | 1/1988 |
| WO | 2013068487 A1 | 5/2013 |

OTHER PUBLICATIONS

Jun. 29, 2020, International Preliminary Report on Patentability, PCT/NL2019/050136.

* cited by examiner

ENGINE CONFIGURATION

CROSS-REFERENCE TO RELATED APPLICATIONS

This application is a U.S. National Stage application under 35 U.S.C. § 371 of International Application PCT/NL2019/050136 (published as WO 2019/172751 A1), filed Mar. 6, 2019, which claims the benefit of priority to Application NL 2020546, filed Mar. 7, 2018. Benefit of the filing date of these prior applications is hereby claimed. Each of these prior applications is hereby incorporated by reference in its entirety.

FIELD OF THE INVENTION

The invention relates to an engine configuration including a turbine in the exhaust path of a combustion engine.

BACKGROUND OF THE INVENTION

In many cases turbines are placed in the exhaust of piston engines to provide power for driving a compressor and/or the engine itself. It can be shown that the engine efficiency can theoretically be improved by as much as 20% if this expansion potential could be utilized that resides in the tail of the pressure graph of work pressure generated by firing a cylinder. This expansion potential in the pressure tail can be harvested by one or multiple turbines placed in the exhaust of piston engines. These turbine(s) are usually used to provide power for driving a compressor (turbocharging) and in some cases provide net power to the engine itself (turbocompound).

Ideally the cylinder pressure after expansion in the cylinder would be transferred directly to the turbine so it could use the full expansion work potential. After expansion through the turbine (blowdown phase) the exhaust gases would be expelled from the cylinder with no backpressure during the exhaust stroke. This ideal process is difficult to realize since in practice exhaust valves do not open immediately, causing throttling loss; also throttling losses are incurred by the manifold, which is filled before pressure is transferred to the turbine; and also turbine adds resistance during the exhaust stroke.

When a cylinder fires, the exhaust opening period of a typical engine is 200-240 degrees crank angle. The four phases of a cylinder, intake, compression, fire, outlet take place over two full revolutions of the crank angle, i.e. 720 degrees.

If the exhaust valve period of one cylinder does not overlap with exhaust periods of other cylinders in the exhaust path, there will be no interference between the exhaust strokes of the connected cylinders and cross charging of another cylinder will not occur when hot exhaust gases are leaving the cylinder. If not, interruption of exhaust gas flow will cause an increase in residual gas content in the cylinder and, a lower scavenging efficiency of the turbine.

FIG. 3 shows an illustration of this. For multiple cylinders connected to a common manifold the resulting exhaust pressure is indicated by the convoluted curve. The overlap between crank angles causes the exhaust strokes of the cylinders to interfere with each other. When more than 3 cylinders are connected to one exhaust manifold, their pulses will overlap, that is, as a consequence, loss of maximum available pressure for the turbine occurs, because gas from one cylinder will not only flow to the turbine but also back to the other cylinder(s). This lowers the available turbine work. Another effect is the increase of cylinder pressure during exhaust stroke because gas is pumped back into it as the exhaust valve of another cylinder is opened. This increases pumping loss (the engine "has to push harder" on the exhaust stroke). The result of these factors is a lower ratio of turbine work versus pumping loss, so either less turbine power can be generated at a given pumping loss or the pumping loss is increased for a given turbine power. In practice the last is most common because the required turbine is determined by the compressor it has to drive. Thermodynamically this can be explained by an increase in throttling loss between the gas in the cylinder and the exhaust manifold, which reduces the available expansion enthalpy. Typically a pulse system can generate 1%-point higher engine efficiency through reduction of pumping loss alone.

In the prior art this is known and there are solutions available that try to minimize the cross charging of the cylinders, e.g. by separation of exhaust paths and the use of more than one compressor. However, this leads to costly and also less energy efficient engine design.

SUMMARY OF THE INVENTION

By preventing cross charging, it should be possible to utilize the high pressure in the cylinder at the end of the expansion stroke through fast exhaust valve opening and minimizing the manifold volume between the cylinders and turbine, known as a so called pulse system. In practice, this limits the number of cylinders to less than 3. Most engines, however, require more than 3 cylinders for reasons of (specific) power output, balancing etcetera.

When more than 3 cylinders are required for reasons of power density & engine vibrations, conventional solutions to increase the turbine efficiency are typically using multiple turbines (mostly in the form of multiple turbochargers). However, this increases cost and complexity as multiple connections for air, exhaust gas, lubrication, controls etcetera have to be provided and increases control complexity to balance the different units. Another disadvantage is that the smaller turbines have intrinsic lower efficiencies, which already partly nullifies the efficiency increase that was sought. Another known solution is to use turbines with multiple inlets. However these designs also suffer from decreased efficiency because different pressures are now working on the same wheel. In practice it is not possible to fully separate the pulses. Besides that the separation of the hot exhaust gases in one turbine housing can cause material stresses leading to durability issues.

Therefore it is still an object to provide an engine design where the turbine efficiency is enhanced without the drawbacks sketched above.

According to the invention, a method is provided of operating a combustion engine comprising more than three cylinders with cylinder valves that are operated in a cycle of fuel intake, pressurizing, firing and exhaust strokes. The method comprises carrying out the cycle for at least two cylinders in a simultaneous operation; and having the simultaneously operated cylinders to exhaust in a manifold that couples to a single turbine.

The invention has as an advantage, that more turbine power can be generated for the same pumping loss, due to more effective use of the exhaust pulse. Thus, additional turbine power can be used to increase the output and thus efficiency of the engine by turbocompounding. Conversely, the same turbine power can be generated with lower pumping loss and increasing the efficiency of the engine.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION OF THE INVENTION

Figure 1:
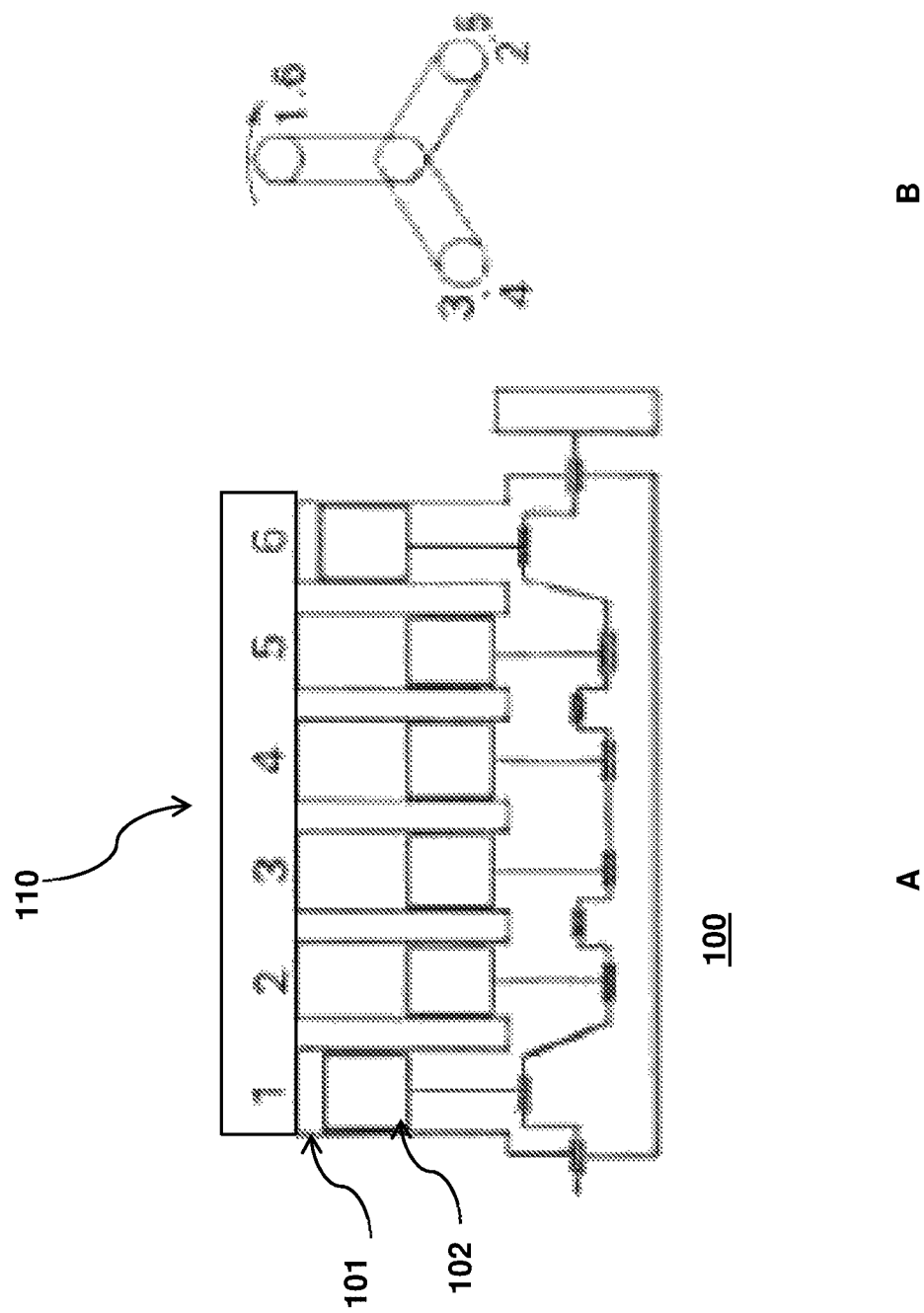
FIGS. 1A and 1B schematically show a schematic setup of an exemplary system comprising a turbocharged engine.

In FIGS. 1a and 1b a schematic overview of the system 100 layout is depicted. The layout depicts schematically a six cylinder inline combustion engine, although it can be understood that the inventions principle can be carried out on other cylinder configurations, in particular, any number of cylinders in the range 4-12. As well known the combustion engine 100 comprises a number of cylinders 101, for the sake of simplicity denoted with numbers 1, 2, 3, 4, 5 and 6. Each cylinder has cylinder valves (not shown) that are operated by a valve system 110 in a cycle of fuel intake, pressurizing, firing and exhaust strokes. In the example, indicated at the schematic cross sectional view in FIG. 1b, valves are operated in a fashion that simultaneously operates the first and sixth cylinder, the fifth and second cylinder and the third and fourth cylinder, said cylinders numbered in consecutive order. This corresponds to the cylinders that have cylinder pistons sharing a same mechanical orientation relative to the crankshaft. More particularly, in FIG. 1b, cylinders 1 and 6 have there pistons 102 at top dead center, whereas cylinders 3 and 4 and 2 and 5 respectively are balanced at 120 degrees from top dead center. It is not necessary for the application of the invention that this mechanical orientation is shared but for balancing purposes it is quite beneficial, since at all times the engine receives a thrust in aligned orientation with the motor bearing in vertical direction, and at all times the engine is balanced in symmetrical fashion relative to the vertical.

Figure 2:
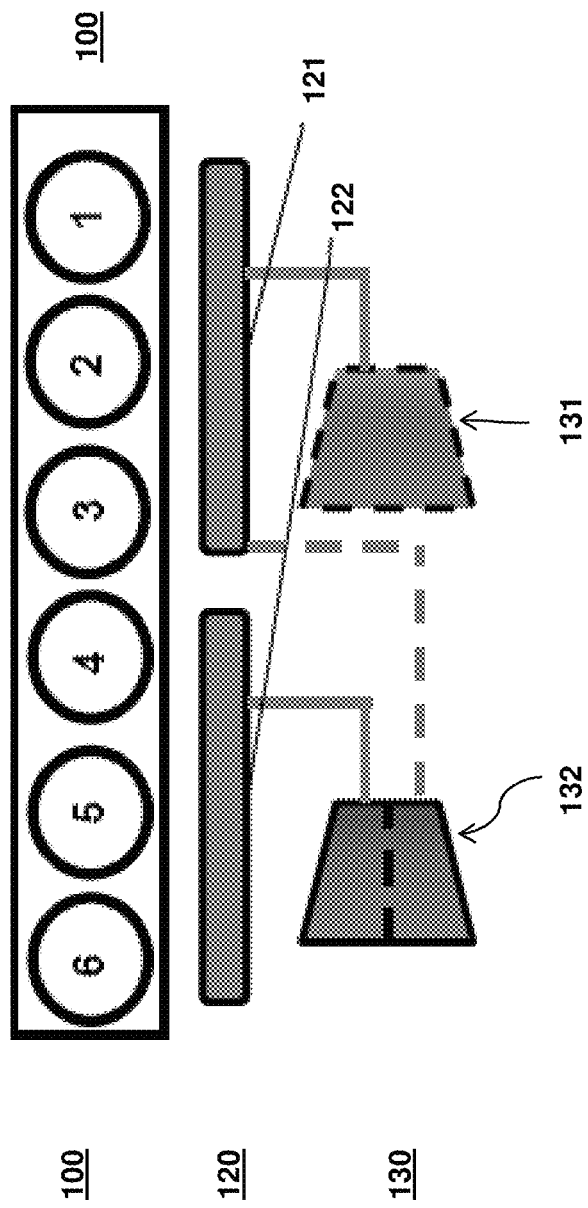
FIG. 2 shows a prior art configuration of the turbine setup for the configuration of FIG. 1.

FIG. 2 shows a conventional design of the combustion engine 100 of FIG. 1. While FIG. 2 shows only one conventional design, many of the existing strategies have similar issues. The combustion engine has a manifold structure 120 and a turbine design 130.

Importantly, for efficient turbine use, first three cylinders 1,2,3 and second three cylinders 4,5,6 are separated to exhaust in distinct manifolds 121 and 122 respectively that couple to separate turbines 131 and 132 of the turbine design 130. Sometimes, the manifolds 131 132 have some sort of coupling between the two turbines, that may form a tradeoff of turbine pressure and pumping loss in the engine.

Figure 3:
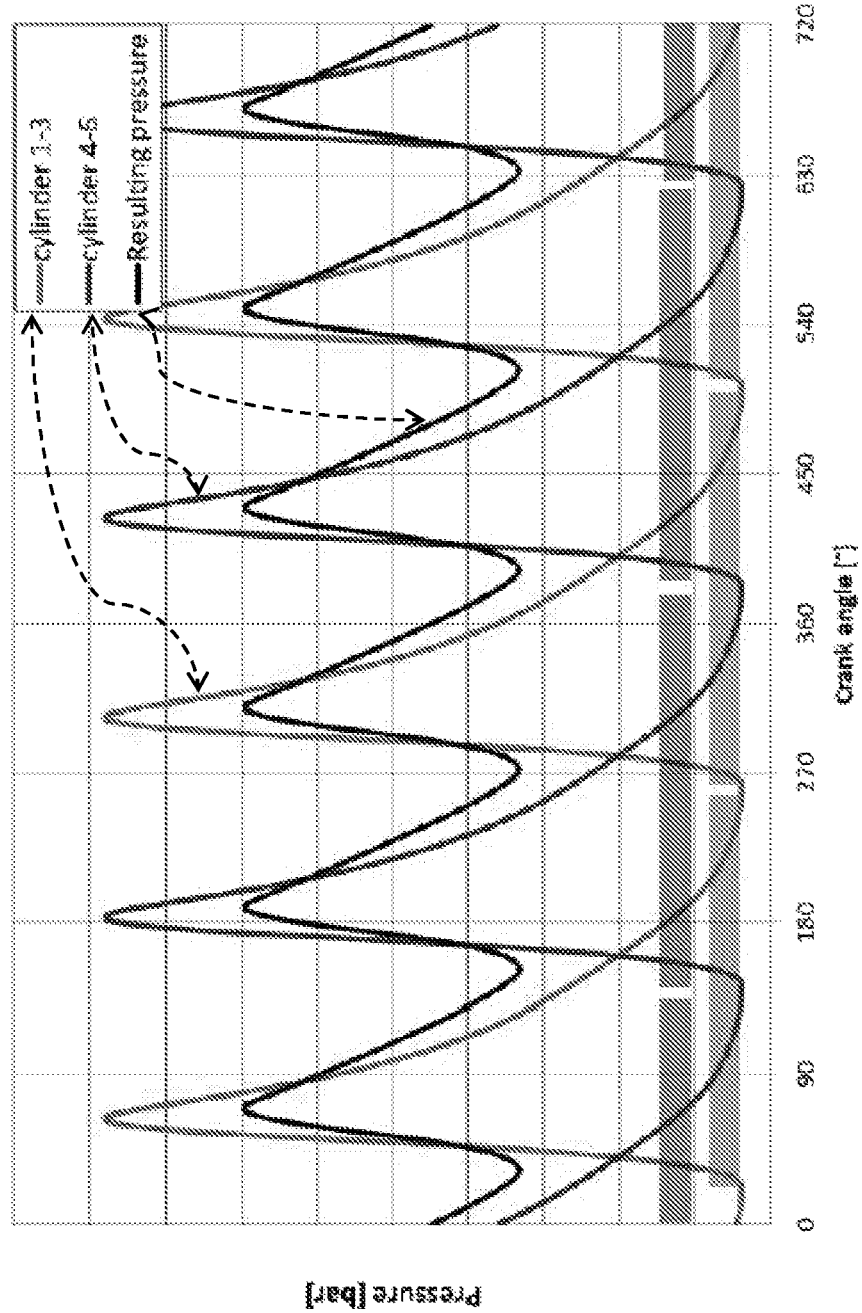
FIG. 3 shows a sample graph of a turbine pressure.

In this configuration, the cylinders are each operated in cycles of a 720 degrees revolution as depicted in FIG. 3. That is, for the pistons of cylinders 1-3, a four stroke cycle is carried out in 720 degrees with cylinders 1-3 having a shift in cycle such that the exhaust pulses are completely separated. Typically, this means that an exhaust stroke is carried out over 230-270 degrees of a single revolution.

Similarly, cylinders 4-6 are operated with a relative time/angle shift to the first three cylinders, so that the exhaust strokes are in alternating fashion, e.g. by a shift of 120 degrees, relative to the strokes produced by the first three cylinders 1-3. It can be seen that the resulting pressure is lower, and that there is more back pressure leading to increased pumping loss. This results in a less efficient turbine operation.

In contrast to the design and operation of FIGS. 2 and 3, FIGS. 4 and 5 show an operation of a new combustion engine 400 comprising more than three cylinders. In the engine 400 cylinder valves that are operated by a valve system 410 in a cycle of fuel intake, pressurizing, firing and exhaust strokes. The valve control system 410 is arranged for carrying out the cycle for at least two cylinders in a simultaneous operation. The simultaneously operated cylinders exhaust in a single manifold 420 that couples to a single turbine 430. A single manifold may be constituted by several part, but should provide a single and direct connection between all exhaust valves of cylinders 1-6 and the turbine 430.

Preferably, the exhaust valves are operated in an optimized way wherein the opening are designed on fast and efficient transfer of exhaust gases, and wherein the manifold has short fluid connections to the turbine pressure, for optimizing the pressure relay.

Figure 4:
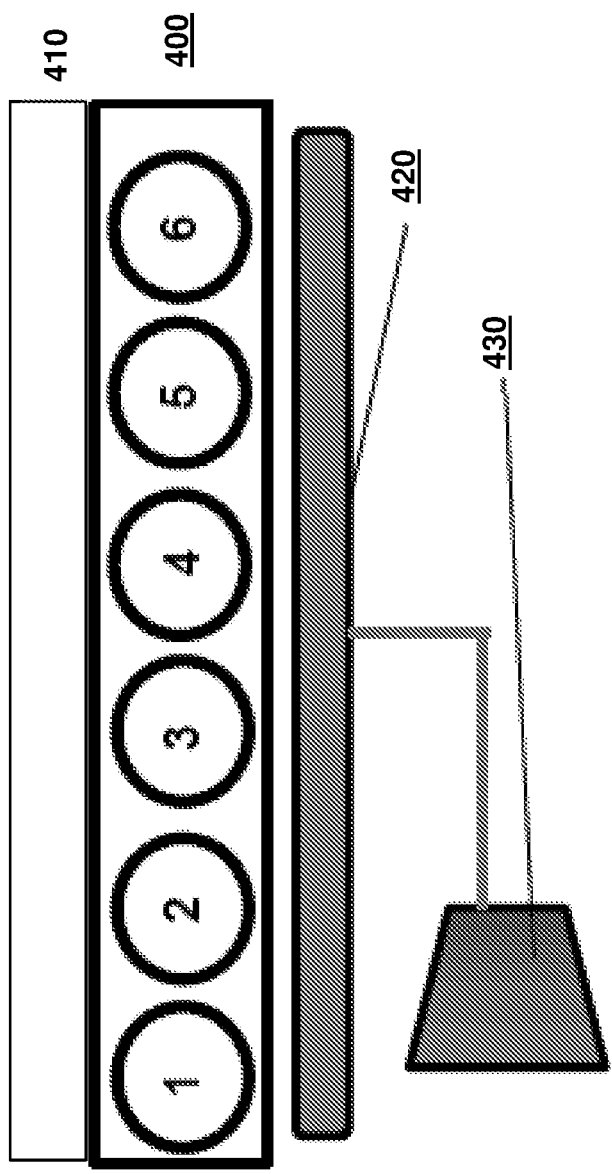
FIG. 4 shows a novel configuration of the turbine setup.
Figure 5:
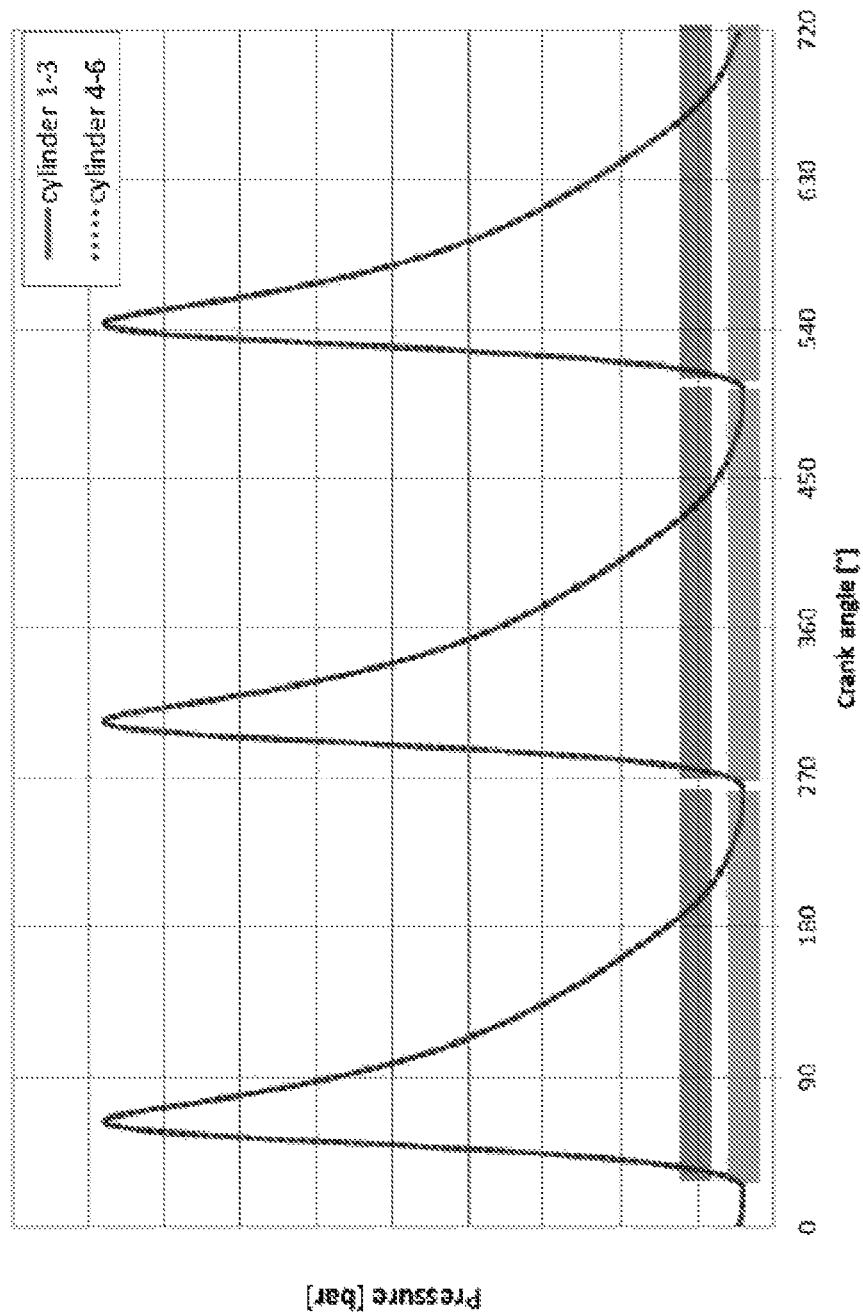
FIG. 5 shows a sample graph of a turbine pressure.

In more detail, FIG. 5 shows how the engine operates in a simultaneous fashion. That is (referring to the design geometry of FIG. 1), the cylinders 1 and 6 that share an aligned mechanical orientation of the piston relative to the crank shaft are operated simultaneously. The combustion engine is preferably a six cylinder inline combustion engine. Since in this geometry, the remaining cylinders are provided in a symmetrical fashion of 120 degrees relative the vertical orientation of top dead center, the torque and vibrational load is relative low. Thus, in this geometry, the six cylinders 1-6 that are operated in a fashion that simultaneously operates the first and sixth cylinder, the fifth and second cylinder and the third and fourth cylinder. In the design of FIG. 4, the valve control is changed relative to the design of FIG. 2. That is, for example, in order to provide three distinct pulses in the 720 degree revolution of the crankshaft, the cam needs only three angular positions for opening and closing of the exhaust valve. Naturally, other valve control systems, such as hydraulical or electrically actuated valves may be operative in similar fashion. In case of cam driven valves this requires a new camshaft or new cam shafts to simultaneously open and close the valves of paired cylinders. In case of a fully flexible valve actuation system, i.e. hydraulic or electric, this can be done by changing the control settings.

Also the fuel injection and ignition systems are modified to fire the paired cylinders simultaneously. With the most common modern systems this can be easily done by changing the control settings as they are already fully flexible. (fuel injection by common rail with individual injectors, coil on plug ignition systems).

While the turbine 430 has no specific adaptations, it's increased size, relative to the twin turbine design of FIG. 2 can be much more efficient.

In FIG. 5 the effective exhaust pressure is illustrated that can be generated in manifold 420. Unlike the convoluted pressure graph of FIG. 3, here the pressure pulses remain distinct, leading to higher maximum actuation pressure for the turbine and lower back pressure.

It is thus believed that the operation and construction of the present invention will be apparent from the foregoing description and drawings appended thereto. For the purpose of clarity and a concise description, features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A method of operating an inline combustion engine comprising six cylinders with cylinder valves that are operated in a stroke cycle of fuel intake, pressurizing, firing and exhaust strokes, the method comprising carrying out the cycle for at least two cylinders in simultaneous firing; and having the simultaneously fired cylinders to exhaust in a single manifold that couples to a single turbine with a single inlet, wherein operating the cylinder valves of the six cylinders of the inline combustion engine by a valve control system is performed in a fashion that simultaneously operates the first and sixth cylinder, the fifth and second cylinder and the third and fourth cylinder, said six cylinders numbered in consecutive order.

2. The method according to claim 1, wherein only cylinders of the six cylinders of the Inline combustion engine are operated simultaneously that have cylinder pistons sharing a same mechanical orientation relative to a crankshaft.

3. An Inline combustion engine comprising:

six cylinders with cylinder valves that are operated in a cycle of fuel intake, pressurizing, firing and exhaust strokes, having a valve control system arranged for carrying out the cycle for at least two cylinders in simultaneous firing; and having the simultaneously fired cylinders exhausting in a single manifold that couples to a single turbine with a single inlet, wherein the valve control system operates the cylinder valves of the six cylinders of the Inline combustion engine in a fashion that simultaneously operates the first and sixth cylinder, the fifth and second cylinder and the third and fourth cylinder, said six cylinders numbered in consecutive order.

4. The combustion engine of claim 3, wherein only cylinders of the six cylinders of the inline combustion engine are operated simultaneously that have cylinder pistons sharing a same mechanical orientation relative to a crankshaft.

* * * * *